United States Patent
Rao et al.

(10) Patent No.: US 8,014,337 B2
(45) Date of Patent: Sep. 6, 2011

(54) METHOD AND SYSTEM FOR WIRELESS MULTI-HOPPING COMMUNICATION

(75) Inventors: Yadunandana N. Rao, Sunrise, FL (US); Apoorv Chaudhri, Cambridge, MA (US); Surhir Rao, Andhra Pradesh (IN)

(73) Assignee: Motorola Solutions, Inc., Schaumburg, IL (US)

( * ) Notice: Subject to any disclaimer, the term of this patent is extended or adjusted under 35 U.S.C. 154(b) by 220 days.

(21) Appl. No.: 12/259,228

(22) Filed: Oct. 27, 2008

(65) Prior Publication Data

US 2010/0103924 A1    Apr. 29, 2010

(51) Int. Cl.
H04B 7/204    (2006.01)
H04W 4/00    (2009.01)
H04W 24/00    (2009.01)
H04L 12/28    (2006.01)

(52) U.S. Cl. ........ 370/319; 370/338; 370/351; 455/423; 455/434

(58) Field of Classification Search .................... 370/352
See application file for complete search history.

(56) References Cited

U.S. PATENT DOCUMENTS

| | | | |
|---|---|---|---|
| 7,167,463 B2 | 1/2007 | Alapuranen | |
| 7,200,149 B1 | 4/2007 | Hasty, Jr. | |
| 7,280,483 B2 | 10/2007 | Joshi | |
| 2003/0045306 A1* | 3/2003 | Himmel et al. | 455/461 |
| 2006/0067354 A1* | 3/2006 | Waltho et al. | 370/433 |
| 2006/0083205 A1* | 4/2006 | Buddhikot et al. | 370/338 |
| 2007/0072600 A1* | 3/2007 | Cho et al. | 455/423 |
| 2008/0165754 A1* | 7/2008 | Hu | 370/342 |
| 2008/0263166 A1* | 10/2008 | Beigi et al. | 709/206 |
| 2008/0268892 A1* | 10/2008 | Hamdi et al. | 455/522 |
| 2008/0293410 A1* | 11/2008 | Chan et al. | 455/434 |
| 2008/0299918 A1* | 12/2008 | Jallon | 455/103 |
| 2009/0046625 A1* | 2/2009 | Diener et al. | 370/319 |
| 2009/0124208 A1* | 5/2009 | Mody et al. | 455/67.11 |

OTHER PUBLICATIONS

Peh et al.: Optimization for Coorperative Sensing in Cognitive Radio Network (IEEE Paper Published in WCNC 2007)—6 Pages.
John Kertekes—"Receiver Operating Characteristic Curve Confidence Intervals and Regions"—IEEE Geoscience and Remote Sensing Letters; vol. 5, No. 2, Apr. 2008—pp. 251-255.

* cited by examiner

Primary Examiner — Huy D Vu
Assistant Examiner — Brandon Renner
(74) Attorney, Agent, or Firm — Barbara R. Doutre

(57) ABSTRACT

A method (400) and system (100) for a wireless multi-hopping communication system is provided, wherein the system (100) includes an access point (102), a source node ($CR_1$), and a plurality of nodes. The source node ($CR_1$) is in communication with the access point (102), and configured to transmit a signal on at least one of a plurality of frequencies. The plurality of nodes are in communication with the access point (102) and the source node ($CR_1$), and configured to transmit a signal on at least one of the plurality of frequencies, wherein the source node ($CR_1$) and the plurality of nodes are adapted to determine a routing path utilizing at least one intermediate node ($CR_2$) of the plurality of nodes and a transmitting frequency of the plurality of frequencies while reducing interference to a primary user of the transmitting frequency.

18 Claims, 6 Drawing Sheets

| NEXT HOP OPTIONS FOR CR$_1$ | SECONDARY CHANNEL LIST FOR CR$_1$ | | | | |
|---|---|---|---|---|---|
| | F$_1$ | F$_2$ | F$_3$ | F$_4$ | F$_5$ |
| CR$_2$ | HIGH | | | MED | LOW |
| CR$_4$ | MED | | | HIGH | MED |
| CR$_5$ | LOW | HIGH | | LOW | HIGH |
| CR$_7$ | | MED | | MED | HIGH |

| CHANNEL / FREQUENCY | $F_{1-2}$ | $F_{1-4}$ | $F_{1-5}$ | $F_{1-7}$ |
|---|---|---|---|---|
| NEXT HOP FORM CR₁ | $CR_2$ | $CR_4$ | $CR_5$ | $CR_7$ |

| CHANNEL / FREQUENCY | $F_{2-1}$ | $F_{2-3}$ | $F_{2-15}$ | $F_{2-21}$ |
|---|---|---|---|---|
| NEXT HOP FORM CR₂ | $CR_1$ | $CR_3$ | $CR_{15}$ | $CR_{21}$ |

*FIG. 6B*

METHOD AND SYSTEM FOR WIRELESS MULTI-HOPPING COMMUNICATION

FIELD OF THE INVENTION

The present invention relates generally to a method and system for wireless multi-hopping communication, and more particularly, to a system and method of wireless multi-hopping communication while utilizing a frequency opportunistically with reduced interference to a primary user of a transmitting frequency.

BACKGROUND

The radio frequency (RF) spectrum is often segmented or divided into various frequency bands for use with differing types of wireless devices. In order to prevent interference, these devices typically may be licensed to operate only within a certain frequency band. Thus, these devices transmit and/or receive signals in a specific frequency range and with pre-defined guard bands, and transmit mask. For example, commercial amplitude modulated (AM) radio broadcasts are transmitted in the 560-1600 KHz frequency spectrum, commercial frequency modulated (FM) radio broadcasts and television broadcasts are transmitted between approximately 50-700 MHz frequency spectrum while Bluetooth and WiFi devices operate in an unlicensed band between 2.4 to 2.4835 GHz. Those specific frequencies that the device uses to transmit and/or receive signals are typically referred to as a channel.

Throughout these specific bands of frequencies with which the devices use for their operation, there are portions of the frequency spectrum that remain unused. Additionally, the use of specific channels within the frequency band can alter depending on the time and/or location. For example, a television or radio broadcast may only transmit a signal on the channel at certain times of the day and at a certain power level. Similarly, the television or radio broadcast may only transmit a signal on the channel in one particular area or region yet while this spectrum in other areas or regions remains unused.

The Federal Communications Commission (FCC) in the United States, and its counterparts around the world, allocate radio spectrum across frequency channels of varying bandwidth. Various bands may cover, for example, AM radio, VH television, cellular phones, citizen's-band radio, pagers and so on. As more devices go wireless, an increasingly crowded amount of radio spectrum needs to be shared. Although the radio spectrum is almost entirely occupied, not all devices use portions of the radio spectrum at the same time or location. At certain times and location, a large percentage of the allocated spectrum may be sitting idle, even though it is officially accounted for. Regulatory authorities are beginning to permit usage of allocated spectrum on a secondary basis under certain strict constraints. For example, the FCC is beginning to permit the secondary usage of channels 21-51, also known as TV white space.

Cognitive radio is a term used to describe a suite of technologies with the potential to significantly alter the manner in which spectrum is utilized by future radio systems. A paradigm for wireless communication in which either a network or wireless device alters its transmission or reception parameters to avoid inference with licensed or unlicensed incumbent users, cognitive radio implements measures to avoid selecting an occupied frequency, so as to avoid interference that can possibly damage the incumbent device and/or reduce its signal reception quality. The alteration of parameters is based on active monitoring of several factors in the external and internal radio environment, such as radio frequency usage, user behavior and network state.

Cooperative spectrum sensing is a technique used to increase the probability of detection of primary users leading to reduced interference to the primary users by the cognitive radio network. However, cooperative sensing has certain drawbacks when individual nodes experience correlated fading or shadowing effects. Shadowing or long term fading refers to variation in received power due to large obstacles between the transmitter and the receiver.

In recent years, a type of mobile communications network known as an "ad-hoc" network has been developed. In this type of network, each mobile node is capable of operating as a base station or router for the other mobile nodes, thus eliminating the need for a fixed infrastructure of base stations. A class of ad-hoc networks called mesh networks, support multiple frequencies as well as multiple hops. As cognitive radio applications expand, it would be desirable to add cognitive radio compatibility powered by cooperative spectrum sensing within a multi-hop network, while keeping in mind that interference issues to the licensed users need to be addressed.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 5 is a table illustrating rankings of a plurality of nodes according to the exemplary method illustrated in FIG. 4 in accordance with an embodiment of the invention.

FIG. 6A and FIG. 6B are examples of tables that illustrate available frequencies in nodes in accordance with the method illustrated in FIG. 4, in accordance with an embodiment of the invention.

Figure 1:
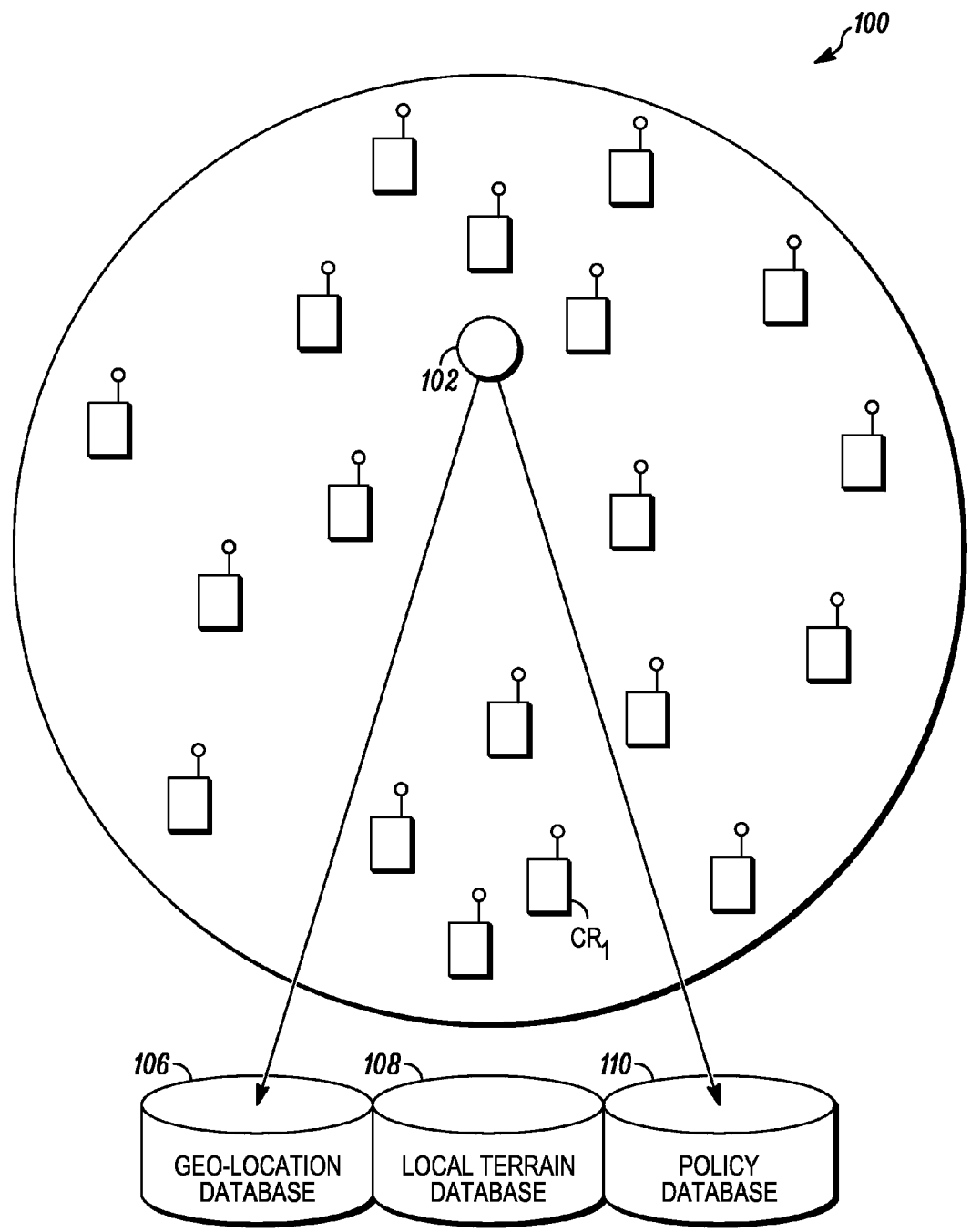
FIG. 1 is a schematic diagram of a wireless multi-hopping communication system, in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and system or apparatus components related to wireless multi-hopping communication. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

FIG. 1 is a schematic diagram of a wireless multi-hopping cognitive radio communication system where a wireless multi-hopping cognitive radio cooperative sensing (CS) communication system 100 includes an access point (AP) 102 and a source node $CR_1$ in communication with the access point 102. Typically, the communication system 100 is at least one system that forms the spectrum of wireless communications, wherein signals are communicated on various frequencies. Those skilled in the art will recognize that the source node $CR_1$ may be configured to transmit voice and/or data on at least one of a plurality of frequencies. A plurality of nodes (e.g., $CR_2$, $CR_3$ . . . $CR_N$) operate such that they also communicate with the AP 102. In system 100 as described herein, at least a portion of the nodes ($CR_1$, $CR_2$, . . . $CR_N$) may include one or more devices for transmitting and/or receiving a signal. Additionally or alternatively, it should be appreciated that the access point 102 can be a mobile or fixed base station transceiver while transmitted and received data in the system can include, but is not limited to, voice, video, image, text information, or combinations thereof. The communication system 100 determines an efficient routing path for transmitting the data from any source node (example $CR_1$) to the access point 102, wherein each hop utilizes a secondary channel which is licensed to a primary user such that there is minimum or no interference to the primary user based upon a plurality of variables. According to one embodiment, the secondary channel is a channel in a licensed (e.g., TV) or unlicensed spectrum, which can be opportunistically used by the system 100 on a secondary basis.

The source node $CR_1$ and the plurality of nodes are adapted to determine an optimal routing path utilizing at least one intermediate node (e.g., $CR_2$) of the plurality of nodes. Moreover, a transmitting frequency is selected for reducing interference to a primary user of the transmitting frequency, as will be fully described in greater detail herein. Typically, the transmitting frequency is selected so that there is minimum or no interference to the primary users. For purposes of explanation and not limitation, the transmitting frequency can be frequency or channel that is utilized to transmit the signal from one node to another node or the access point 102, such as, but not limited to, transmitting a signal from the source node $CR_1$ to the intermediate node $CR_2$.

According to one embodiment, the primary user of a transmitting frequency is a user of a system included in the spectrum other than the communication system 100, such as, but not limited to, a television broadcast, a radio broadcast, wireless microphones, or the like, wherein the system 100 communicates via the primary user's transmitting frequency when the primary user is not using the frequency. Thus, the system 100 is utilizing frequencies that are licensed to primary users, wherein the primary users or the communication thereof are not part of the system 100.

In operation, the communication system 100 transmits voice and/or data from the source node $CR_1$ to the access point 102 utilizing at least a portion of the plurality of nodes. The plurality of nodes selected for the routing path between the source node $CR_1$ and the access point 102 are based upon reducing interference to a primary user of the transmitting frequency between each node. Those skilled in the art should recognize that the source node $CR_1$ can also operate as an intermediate node in the communication of data to the access point 102. Each node in the communication system is similar and can act either as router for other nodes or source in case it wants to transmit voice and/or data to the access point. Thus, when another node of the plurality of nodes is the originator of the data, $CR_1$ will also operate as intermediate node.

The communication system 100 determines an efficient routing path for transmitting the data from the source node $CR_1$ to the access point 102 based upon a plurality of variables derived and/or determined from a single data base or various data bases. The one or more data bases can be included in the communication system 100, external to the communication system 100, or a combination thereof. Examples of these variables may include the location of the access point 102, the identity and/or the location of the source node $CR_1$ as received from a geo-location database 106, the identity and/or location of the plurality of nodes as received from the geo-location database 106, the local terrain data that is obtained from a local terrain database 108 (e.g., mountainous territory), any "policy data" or other rules of the communication system 100 that is obtained from the policy database 110 (e.g., constraints the communication system 100), the like, or a combination thereof. Additionally or alternatively, the geo-location database 106 can provide information as to the primary users of frequencies, coverage contours of the primary users, other information as to the operation of primary users, the like, or a combination thereof.

Figure 2:
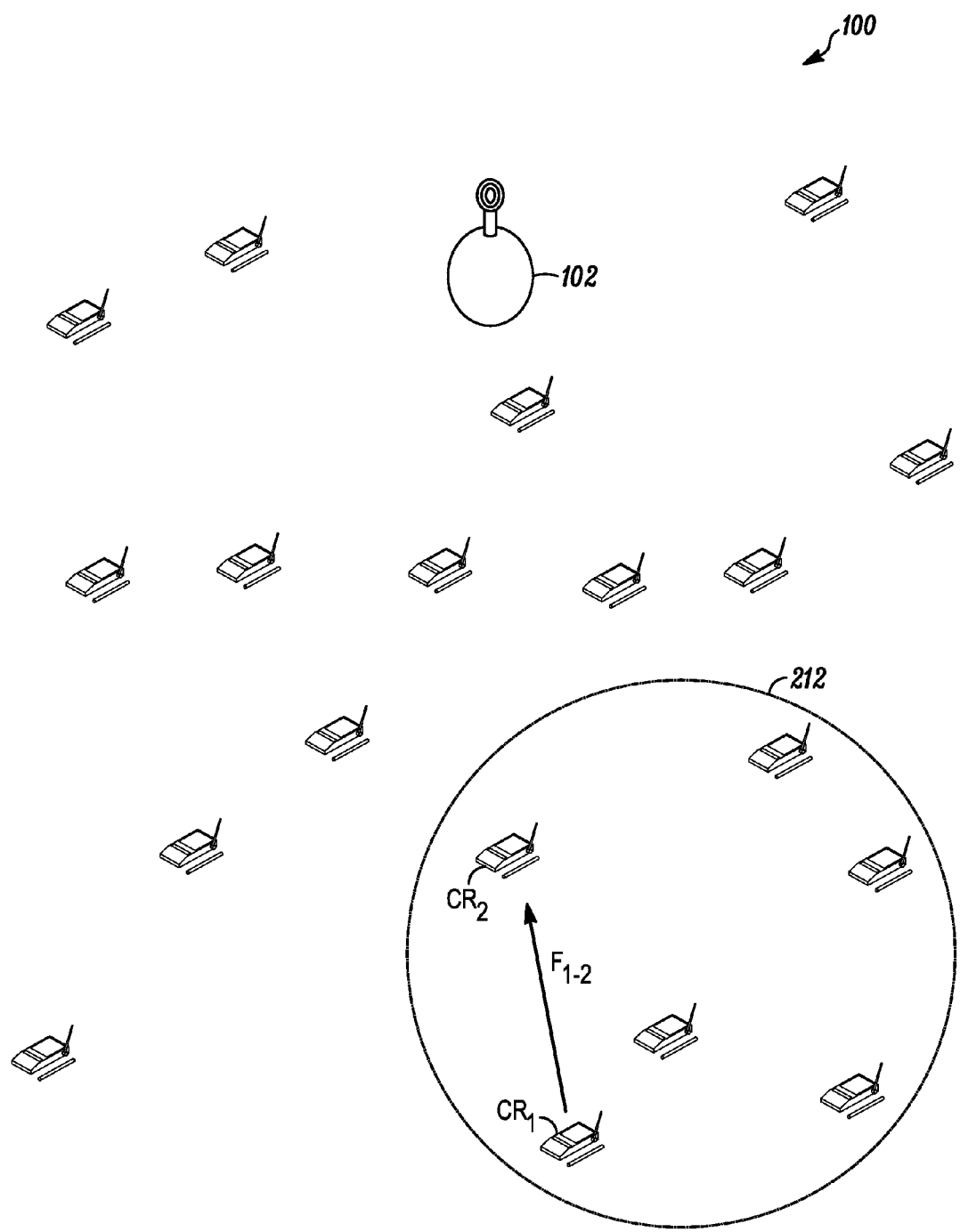
FIG. 2 is a schematic diagram of a wireless multi-hopping communication system in accordance with an embodiment of the invention.

FIG. 2 is a schematic diagram of a wireless multi-hopping communication system in accordance with an embodiment of the invention. In the multi-hopping system, the access point 102 initially communicates a list of nodes that are within the system 100. Alternatively, each node may detect the presence of neighboring nodes through other techniques like beaconing etc. A set of nodes that are within a certain distance (d) 212 of the source node $CR_1$ is then chosen from the list. By way of explanation and not limitation, the distance 212 can be a radius from the source node $CR_1$, or the distance 212 can represent an area or neighborhood around the source node $CR_1$ that includes a set of nodes. Typically, the distance 212 may be determined to be a distance d that is greater than two times a minimum distance that substantially guarantees uncorrelated shadowing and less than the maximum range of the source node $CR_1$ ($d_{max}$). This can be expressed in the following equation:

$$2d_{min} < d < d_{max} \qquad (Eq. 1)$$

Typically, the value of the minimum distance that guarantees uncorrelated shadowing ($d_{min}$) is at least partially based upon a terrain that the communication system 100 is operating. This data can be determined based upon a local terrain database 108 (FIG. 1). The source node $CR_1$ then routes or transmits the data to a second or intermediate node $CR_2$ on a determined frequency ($F_{1-2}$) based on a standing or ranking of the nodes. As will be evident to those skilled in the art, the node $CR_2$ may be assigned a higher rank than at least one other of the plurality of nodes within a neighborhood that is dependent on the distance 212. According to one embodiment of the invention, the node $CR_2$ that is selected to receive the data from the source node $CR_1$ will be the highest ranked node within its neighborhood.

In operation, the routing path between the source node $CR_1$ and the access point 102 is determined based upon at least one operating condition of the source node $CR_1$ and other nodes identified within its neighborhood. For example, the operating condition of the source node $CR_1$ can utilize one or more algorithms for determining distances between the source node $CR_1$ and other nodes identified within its neighborhood, the transmitting power needed to transmit the signal from the source node $CR_1$ to any of the identified nodes, and the transmitting frequencies that can be used without causing interference to the licensed primary users. A metric called sensing reliability is estimated by each identified node for determining the transmitting frequencies. The sensing reliability can be based upon determining a "confidence" level in detecting the presence of a primary user at some predetermined transmitting frequency. Typically, the primary user of the transmitting frequency will be a licensed user of the transmitting frequency, wherein the primary user can be a user of a system other than the communication system 100. Thus, the transmitting frequency is used to transmit voice and/or data between the source node $CR_1$, at least a portion of the plurality of nodes and, the access point 102, when the licensed primary user is not using the transmitting frequency or not being interfered with. The intermediate node $CR_2$ that receives the signal from the source node $CR_1$ can be determined based upon a weighted combination of the distance to source node $CR_1$, the required transmit power of the source node $CR_1$ to reach the intermediate node $CR_2$, and the sensing reliability of the source node $CR_2$. Thus, the routing path and the associated transmit frequencies from the source node $CR_1$ to the access point 102 are determined with respect to weighted combination that is computed for each node.

Figure 3:
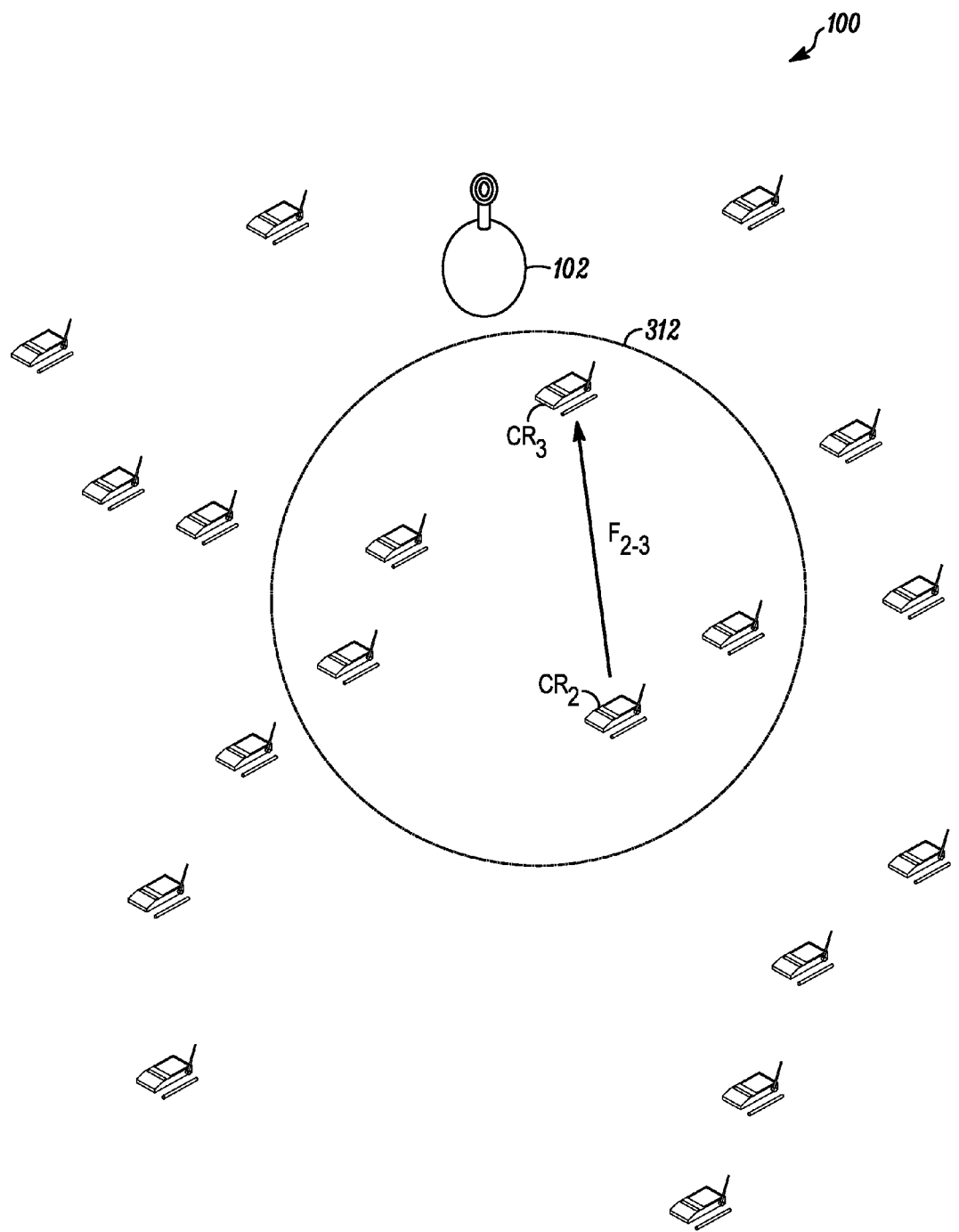
FIG. 3 is a schematic diagram of a wireless multi-hopping communication system in accordance with an embodiment of the invention.

FIG. 3 is a schematic diagram of the wireless multi-hopping communication system 100, wherein it is determined which of the plurality of nodes can receive a signal from the node $CR_2$ after the node $CR_2$ has received the signal from the source node $CR_1$, according to one embodiment. Similar to the source node $CR_1$ shown in FIG. 2, the access point 102 transmits a list of nodes that are within a certain distance 312 of the node to $CR_2$. Thus, the intermediate node $CR_2$ transmits the data to another intermediate node $CR_3$ within the distance or neighborhood 312. These signals can be transmitted from the node $CR_2$ to the node $CR_3$ at the same or different frequency ($F_{2-3}$) than that which was used to transmit the signal from the source node $CR_1$ to the intermediate node $CR_2$. In the event that the access point 102 is within the distance 212 (FIG. 2) or within the distance 312 (FIG. 3), the signal will be transmitted from the node $CR_1$ or $CR_2$, respectively, to the access point 102 rather than another of the plurality of nodes within the communication system 100.

Figure 4:
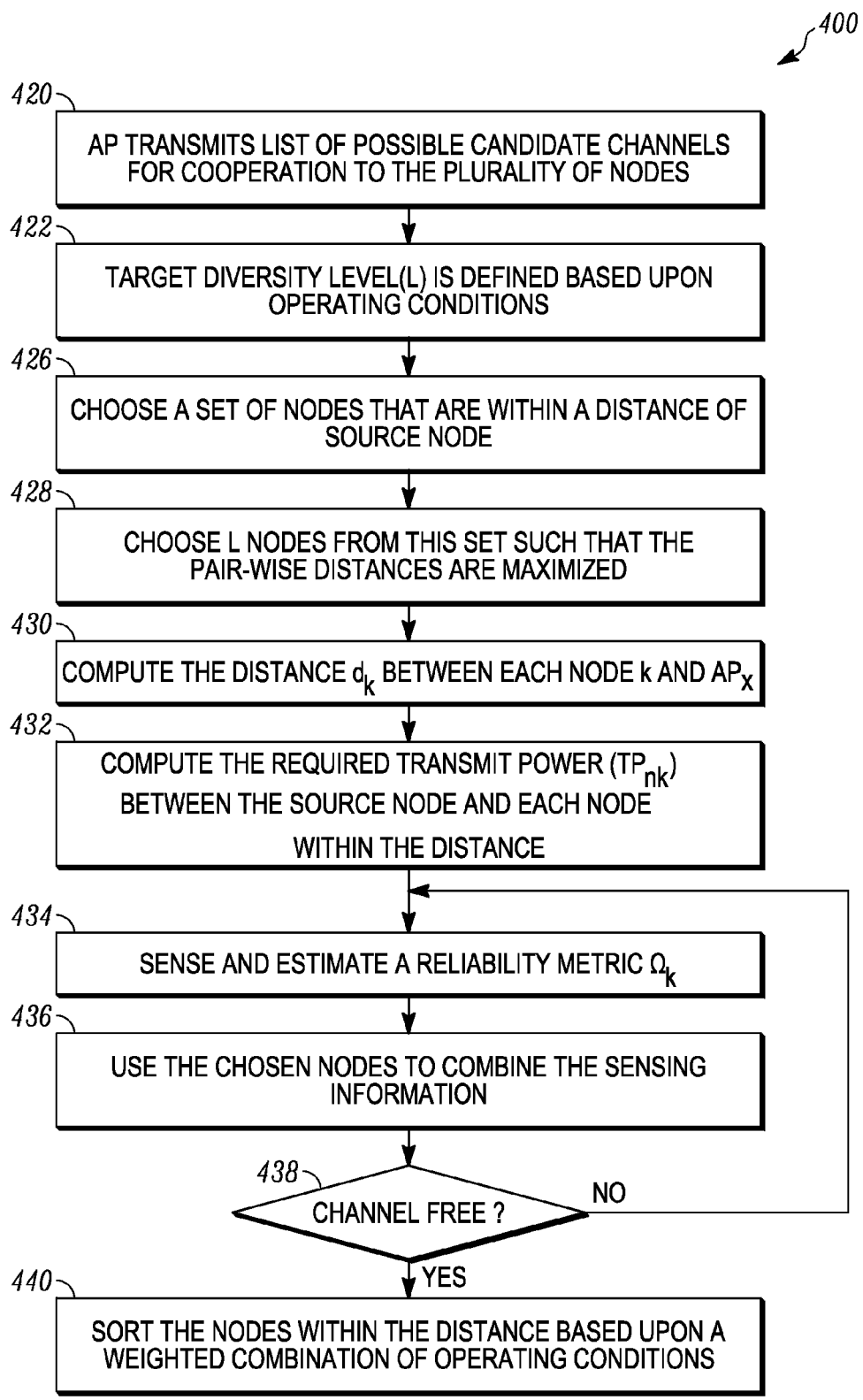
FIG. 4 is a flow chart diagram illustrating a method of communicating between a plurality of nodes in accordance with an embodiment of the invention.

FIG. 4 is a flow chart diagram illustrating a method of communicating between a plurality of nodes 400 in accordance with an embodiment of the invention. The diagram illustrates a method of communicating between a plurality of nodes to minimize interference to a primary user of a transmitting frequency. It should be noted that this flow chart in FIG. 4 is executed at every node within the communication system 100. The access point 102 transmits a list of possible candidate channels or frequencies for cooperation to the plurality of nodes 420. Typically, a channel list is a set of active or alternate channels. A target diversity level is then defined based upon operating conditions 422. Typically, the target diversity level can be a minimum number of uncorrelated nodes that are needed for achieving a target, or desired, probability of primary user detection with a specified false alarm level. A set of nodes is then chosen 426 that fall within the distance 212 of the source node $CR_1$ (this is just an example. The same flowchart runs for all the CR nodes). This can be represented by the following equation, wherein ψ represents a set of nodes, |ψ| represents a number of elements or nodes in a set, M represents the number of nodes, and L represents a target diversity:

$$\psi |\psi| = M \geq L \qquad \text{(Eq. 2)}$$

Subsequently, L nodes can be chosen from this set, such that the pair-wise distances are maximized 428 which may be greater than the minimum distance ($d_{min}$). The distance between each node and the access point 102 is computed 430 and a required transmit power ($TP_k$) is computed 432 between the source node $CR_1$ and each node within the neighborhood 212.

For each candidate frequency or channel that $CR_1$ received the following steps are performed. Each CR node in the chosen set ψ senses the channel for the presence of primary activity using one or more spectrum sensing algorithms. A sensing reliability metric ($\Omega_k$) 434 is computed. The chosen nodes in the set ψ cooperatively 436 determine using a suitable fusion method (OR, AND etc.) whether primary activity is present or not 438. The spectrum is then sensed, such that if it is determined that the channel is free 438, then the CR nodes are sorted based upon a weighted combination of one or more operating conditions including distances between the CR nodes to the AP 102, required transmit powers from $CR_1$ to the other CR nodes in the set ψ and the sensing reliabilities of the CR nodes 440. Should it be determined that the channel is not free 438, then the channel is marked occupied and the steps 434-440 are continued for other channels in the list. Typically, spectrum sensing is the process of detecting an incumbent in a spectrum or a spectrum opportunity. A spectrum opportunity can be a band of frequency not used by the primary user of the band and can be used by a secondary user without causing interference to the primary user.

As should be further evident to those skilled in the art, the routing path can be determined as a function of the sorted list of the plurality of nodes. Thus, at least one node of the plurality of nodes with a greater ranking can route the communication from the source node $CR_1$.

FIG. 5 is a table illustrating rankings of a plurality of nodes according to the exemplary method illustrated in FIG. 4. This exemplary table sets forth the ranking of frequencies or channels ($F_1$-$F_5$) based upon monitored operating conditions. For example, the source node $CR_1$ has a choice and may either transmit the data to $CR_2$ using frequency $F_1$, transmit to $CR_4$ using frequency $F_4$, transmit to $CR_5$ using frequency $F_2$ or $F_5$, or transmit to $CR_7$ using frequency $F_5$. Thus the source node $CR_1$ has multiple options to choose for the next hop. Out of these nodes with high rankings on a particular frequency, the node can be selected based upon a shortest path to the access point 102, such that the total number of hops is reduced. Typically, nodes and frequencies having a medium, low, or no ranking will not be used while other nodes and frequencies having a higher ranking are preferred. As seen in the table, frequency $F_3$ is illustrated as not being available, which may be based upon the primary user utilizing the frequency $F_3$. It should be appreciated by those skilled in the art that similar tables or rankings will be generated for every node within the communication system 100.

FIG. 6A and FIG. 6B are examples of tables that illustrate available frequencies in nodes in accordance with the method illustrated in FIG. 4. It should be noted that each node will execute the flowchart described in FIG. 4 and derive the routing options as well as the associated transmit frequencies. Further, the determination of these routing options may be accomplished at power-up. Each node may have multiple options to relay the voice and/or data in order to reach the access point 102. For example, the source node $CR_1$ may transmit to the node $CR_2$, node $CR_4$, node $CR_5$, or node $CR_7$ using selected frequencies (e.g., frequencies $F_{1-2}$, $F_{1-4}$, $F_{1-5}$, and $F_{1-7}$, respectively) based upon the ranking (FIG. 6A). Similarly, the second node $CR_2$ can transmit to the node $CR_3$, node $CR_{15}$, and yet another node $CR_{21}$ using respective frequencies (e.g., frequencies $F_{2-1}$, $F_{2-3}$, $F_{2-15}$, an $F_{2-21}$, respectively) based upon the ranking (FIG. 6B). The existence of multiple choices as the next hop from any given source node gives the flexibility in cases where the preferred path exhibits poor link quality.

Thus, the present invention can be directed to a system or method of wireless multi-hopping while reducing interference to a primary use of a transmitting frequency, according to one embodiment. The system and method can implement a plurality of nodes, wherein a routing path is determined from a source node to an access point utilizing at least a portion of the plurality of nodes based upon at least one operating condition. The invention is advantageous since the nodes and available frequencies are efficiently utilized, such that the system 100 communicates a signal on a transmitting frequency when the primary user of the transmitting frequency is not transmitting. The efficient selection of the nodes for cooperative sensing to determine the transmitting frequencies overcomes the correlated shadowing and fading effects that is a major drawback of past cooperative sensing.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A wireless multi-hopping communication system comprising:
   an access point;
   a source node in communication with the access point, and configured to transmit data on at least one of a plurality of frequencies, the source node operating under at least one operating condition defining a target diversity level, the target diversity level being a minimum number of uncorrelated nodes that are needed for achieving a target probability of primary user detection with a specified false alarm level;
   a plurality of nodes in communication with the access point and the source node, and configured to transmit the data on at least one of the plurality of frequencies on a secondary basis, wherein the source node and the plurality of nodes are adapted to determine a routing path from the source node to the access point utilizing at least one intermediate node of the plurality of nodes and a transmitting frequency of the plurality of frequencies while reducing interference to a primary user of the transmitting frequency; and
   the at least one intermediate node used in the routing path being selected based on a ranking of the plurality of nodes, the ranking being determined as a weighted function of a distance between the source node and the access point, a transmit power needed to transmit the signal from the source node to an intermediate node of the plurality of nodes, and a sensing reliability of the intermediate node, the highest ranking node being used as the intermediate node to route the communication from the source node to the access point.

2. The system of claim 1, wherein the access point obtains data from at least one of a geo-location database, a local terrain database, and a policy database, such that the data is communicated to the source node and utilized to determine the routing path.

3. The system of claim 1, wherein the intermediate node determines a routing path from the intermediate node to the access point utilizing another intermediate node of the plurality of nodes and a second transmitting frequency of the plurality of frequencies while reducing interference to a primary user of the second transmitting frequency.

4. The system of claim 1, wherein the system is a cognitive radio system.

5. A method of communicating between a plurality of nodes and an access point to reduce interference to primary users transmitting on a primary channels, the method comprising the steps of:
   transmitting a list of potential secondary channels from the access point to the plurality of nodes;
   providing a list with the identity of the plurality of nodes to a source node for determining its adjacent nodes;
   defining a target diversity level based upon at least one operating condition of the source node, the target diversity level being a minimum number of uncorrelated nodes that are needed for achieving a target probability of primary user detection with a specified false alarm level;
   choosing a set of nodes from the list of the plurality of nodes based upon which of the nodes is within a distance of the source node, each node within the chosen set sensing the list of potential secondary channels;
   sorting the set of chosen nodes based upon a ranking of each node that is a function of at least one operating condition; and
   determining a routing path utilizing at least one sorted node, wherein the routing path is a function of the sorted set, such that at least one node with a greater ranking in the sorted set routes the communication from the source node.

6. The method of claim 5 further comprising the step of:
   determining at least one of a distance between the source node and the access point, and a distance between the source node and an intermediate node of the plurality of nodes.

7. The method of claim 5 further comprising the step of:
   determining a transmitting power needed to transmit a signal from the source node to an intermediate node of the plurality of nodes.

8. The method of claim 5 further comprising the step of:
   computing a sensing reliability metric of the at least one node.

9. The method of claim 8, wherein the step of computing a sensing reliability metric of the at least one node further comprises the step of:
  determining a confidence level in detecting the presence of a primary user of a transmitting frequency.

10. The method of claim 5, wherein the step of sorting the set of chosen nodes further comprises the step of sorting the chosen nodes as a function of a weighted combination of a distance between at least one node and the access point, a transmit power needed to transmit the signal from the source node to the at least one node of the plurality of nodes, and a sensing reliability of the at least one node.

11. The method of claim 5, wherein the step of sorting the set of chosen nodes further comprises ranking each of the plurality of nodes with respect to a transmitting frequency.

12. The method of claim 5 further comprising the step of communicating a signal to an intermediate node of the plurality of nodes from the source node, wherein the intermediate node performs the steps of:
  choosing at least one node from the list of plurality of nodes based upon a distance to the intermediate node;
  sorting the at least one node of the chosen set based upon at least one operating condition; and
  determining a routing path utilizing at least one sorted node, wherein the routing path is a function of the sorted set, such that at least one node with a greater ranking in the sorted set routes the communication from the intermediate node.

13. The method of claim 5 further comprising the step of obtaining data from at least one of a geo-location database, a local terrain database, and a policy database, such that the source node utilizes the obtained data from at least one of the geo-location database, the local terrain database, and the policy database to determine the routing path.

14. A method of communicating between a plurality of nodes and an access point to reduce interference to a primary user of a primary transmitting channel, the method comprising the steps of:
  a) transmitting a list of potential secondary channels from the access point to the plurality of nodes;
  b) providing a list of the identity of each the plurality of nodes to a source node for determining adjacent nodes;
  c) determining a location of the source node and at least a portion of the plurality of nodes identified in the list of the plurality of nodes;
  d) choosing a set of nodes from the list of the plurality of nodes, such that a pair-wise distance is maximized;
  e) determining a distance between the chosen set of nodes and the access point;
  f) determining a transmitting power needed to transmit a signal from the source node to an intermediate node of the plurality of nodes;
  g) performing spectrum sensing on the secondary channels to cooperatively determine if a primary user is present on the secondary channels;
  h) computing the sensing reliability of the chosen set of nodes;
  i) sorting the nodes of the chosen set based upon a ranking of the nodes that is a weighted function of the determined distance between any intermediate nodes and the access point, the determined transmitting power, and the sensing reliability of the intermediate nodes; and
  j) determining a routing path from the source node utilizing at least one of the sorted nodes, wherein the routing path is a function of the sorted set, such that the node with a greater ranking in the sorted set routes the communication from the source node.

15. The method of claim 14, wherein the step of sorting the plurality of nodes further comprises ranking each of the plurality of nodes with respect to a transmitting frequency.

16. The method of claim 14 further comprising the step of communicating a signal to an intermediate node of the plurality of nodes from the source node, wherein the intermediate node performs the steps of:
  choosing a set of nodes from the list of the plurality of nodes based upon which of the nodes is within a distance of the intermediate node;
  sorting the nodes of the chosen set based upon a ranking of the nodes that is a function of at least one operating condition; and
  determining a routing path utilizing from the intermediate node utilizing the sorted set, wherein the routing path is a function of the sorted set, such that the nodes with a greater ranking in the sorted set routes the communication from the intermediate node.

17. The method of claim 14, wherein the step of computing the sensing reliability of any node further comprises the step of determining a confidence level in detecting the presence of a primary user of the transmitting frequency.

18. The method of claim 14, further comprising the step of:
  repeating step a) through step j) for determining a routing path for each of the chosen set of nodes of the plurality of nodes; and
  marking any secondary channels as unavailable for use at a source node based on spectrum sensing involving the chosen set of nodes.

* * * * *

UNITED STATES PATENT AND TRADEMARK OFFICE
CERTIFICATE OF CORRECTION

| | | |
|---|---|---|
| PATENT NO. | : 8,014,337 B2 | Page 1 of 1 |
| APPLICATION NO. | : 12/259228 | |
| DATED | : September 6, 2011 | |
| INVENTOR(S) | : Rao et al. | |

It is certified that error appears in the above-identified patent and that said Letters Patent is hereby corrected as shown below:

On the Title page, Item (75), under "Inventors", Line 3, delete "Surhir" and insert -- Sudhir --, therefor.

Signed and Sealed this
Eighteenth Day of December, 2012

David J. Kappos
*Director of the United States Patent and Trademark Office*